US008793565B2

(12) United States Patent
Skwirblies

(10) Patent No.: US 8,793,565 B2
(45) Date of Patent: *Jul. 29, 2014

(54) FILE FORMAT CONVERSION OF AN INTERACTIVE ELEMENT IN A GRAPHICAL USER INTERFACE

(75) Inventor: Sven Skwirblies, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 980 days.

This patent is subject to a terminal disclaimer.

(21) Appl. No.: 12/486,137

(22) Filed: Jun. 17, 2009

(65) Prior Publication Data

US 2013/0125065 A1 May 16, 2013

Related U.S. Application Data

(63) Continuation of application No. 11/126,852, filed on May 10, 2005, now Pat. No. 7,581,175.

(51) Int. Cl.
*G06F 17/00* (2006.01)

(52) U.S. Cl.
USPC ............ 715/207; 715/205; 715/234; 715/273

(58) Field of Classification Search
USPC .................. 715/200, 201, 204, 234, 239, 273
See application file for complete search history.

(56) References Cited

U.S. PATENT DOCUMENTS

| | | | |
|---|---|---|---|
| 5,745,738 A * | 4/1998 | Ricard ............................. 703/13 |
| 5,890,172 A * | 3/1999 | Borman et al. ................ 715/205 |
| 6,226,655 B1 * | 5/2001 | Borman et al. ................ 715/207 |
| 6,389,437 B2 * | 5/2002 | Stoub ............................. 715/201 |
| 6,757,870 B1 * | 6/2004 | Stinger ........................ 715/234 |
| 6,938,083 B1 * | 8/2005 | Teague .......................... 709/225 |
| 6,976,215 B1 * | 12/2005 | Roderick et al. .............. 715/702 |
| 7,114,124 B2 * | 9/2006 | Brindle ......................... 715/253 |
| 7,191,401 B2 * | 3/2007 | Roderick et al. .............. 715/702 |
| 7,496,835 B1 * | 2/2009 | Chen et al. .................... 715/234 |
| 7,640,494 B1 * | 12/2009 | Chen et al. .................... 715/234 |
| 7,900,191 B1 * | 3/2011 | Raghavan ..................... 717/113 |
| 7,984,422 B2 * | 7/2011 | Graham ........................ 717/111 |
| 2001/0011364 A1 * | 8/2001 | Stoub ............................... 717/1 |
| 2002/0042750 A1 * | 4/2002 | Morrison ........................ 705/26 |
| 2002/0065817 A1 * | 5/2002 | Ito et al. ............................ 707/5 |
| 2002/0152236 A1 * | 10/2002 | Incertis-Carro ............ 707/501.1 |
| 2002/0194194 A1 * | 12/2002 | Fenton et al. ............... 707/104.1 |
| 2003/0110503 A1 * | 6/2003 | Perkes .............................. 725/86 |
| 2004/0093355 A1 * | 5/2004 | Stinger ...................... 707/104.1 |
| 2005/0172219 A1 * | 8/2005 | Hintermeister et al. ...... 715/513 |
| 2006/0031765 A1 * | 2/2006 | Roderick et al. .............. 715/702 |

OTHER PUBLICATIONS

Supplemental Notice of Allowance mailed Jul. 22, 2009 in co-pending U.S. Appl. No. 11/126,852, 3 pages.

Issue Notification mailed Aug. 5, 2009 in co-pending U.S. Appl. No. 11/126,852, 1 page.

(Continued)

*Primary Examiner* — Stephen Hong
*Assistant Examiner* — Gregory J Vaughn
(74) *Attorney, Agent, or Firm* — Wolfe-SBMC

(57) ABSTRACT

Briefly, in accordance with one embodiment, in a graphical user interface, an interactive element in a first file format, such as hypertext markup extension language, may be converted into a second file format, such as portable document format, wherein the interactivity of the interactive element may be preserved in the conversion process.

20 Claims, 4 Drawing Sheets

(56) References Cited

OTHER PUBLICATIONS

Office action mailed Apr. 4, 2008 in co-pending U.S. Appl. No. 11/126,852, 10 pages.
Amendment filed Jun. 30, 2008 in co-pending U.S. Appl. No. 11/126,852, 14 pages.
Final Office action mailed Sep. 18, 2008 in co-pending U.S. Appl. No. 11/126,852, 12 pages.
Amendment AF filed Oct. 15, 2008 in co-pending U.S. Appl. No. 11/126,852, 15 pages.
Advisory action mailed Nov. 12, 2008 in co-pending U.S. Appl. No. 11/126,852, 3 pages.
Examiner's Interview Summary mailed Dec. 10, 2008 in co-pending U.S. Appl. No. 11/126,852, 2 pages.
Request for Continued Examination filed Dec. 17, 2008 in co-pending U.S. Appl. No. 11/126,852, 16 pages.
Notice of Allowance mailed Mar. 9, 2009 in co-pending U.S. Appl. No. 11/126,852, 7 pages.
Issue Fee filed Jun. 9, 2009 in co-pending U.S. Appl. No. 11/126,852, 15 pages.
"Advisory Action", U.S. Appl. No. 11/126,852, (Nov. 12, 2008), 3 pages.
"Final Office Action", U.S. Appl. No. 11/126,852, (Sep. 18, 2008), 12 pages.
"Non-Final Office Action", U.S. Appl. No. 11/126,852, (Apr. 4, 2008), 9 pages.
"Notice of Allowance", U.S. Appl. No. 11/126,852, (Mar. 9, 2009), 7 pages.

* cited by examiner

FILE FORMAT CONVERSION OF AN INTERACTIVE ELEMENT IN A GRAPHICAL USER INTERFACE

This application is a Continuation of U.S. patent application Ser. No. 11/126,852, filed on May 10, 2005, entitled "FILE FORMAT CONVERSION OF AN INTERACTIVE ELEMENT IN A GRAPHICAL USER INTERFACE," the contents of which are incorporated herein by reference.

BACKGROUND

Information in electronic media typically may be represented, accessed, and/or manipulated on a computing platform using a graphical user interface. Such a graphical user interface may allow a user to open, read, and/or otherwise access information stored and/or represented in one of several file formats. Since different users and/or different computing platforms may use one or more various software programs to read and/or display such information, typically not all users are able to open and/or rea information stored in a first file format when the user is using a software program designed to open and/or read information stored in a second format. For example, information may be stored in a hyper text markup language (HTML) file format to be accessed and/or displayed using a web browser program, and/or information may be stored in a portable data file (PDF) format to be accessed and/or displayed for example using an Adobe® Acrobat® program or the like. Typically, a user may convert information stored in a first file format to a second file format using the first and/or the second respective program, for example for visualization on different computing platforms, for archiving, and so on. However, such a conversion process typically may not provide a perfect conversion of the information, formatting, features, and so on, and as a result, some features in the first file format may not perfectly appear and/or function properly in the second file format.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
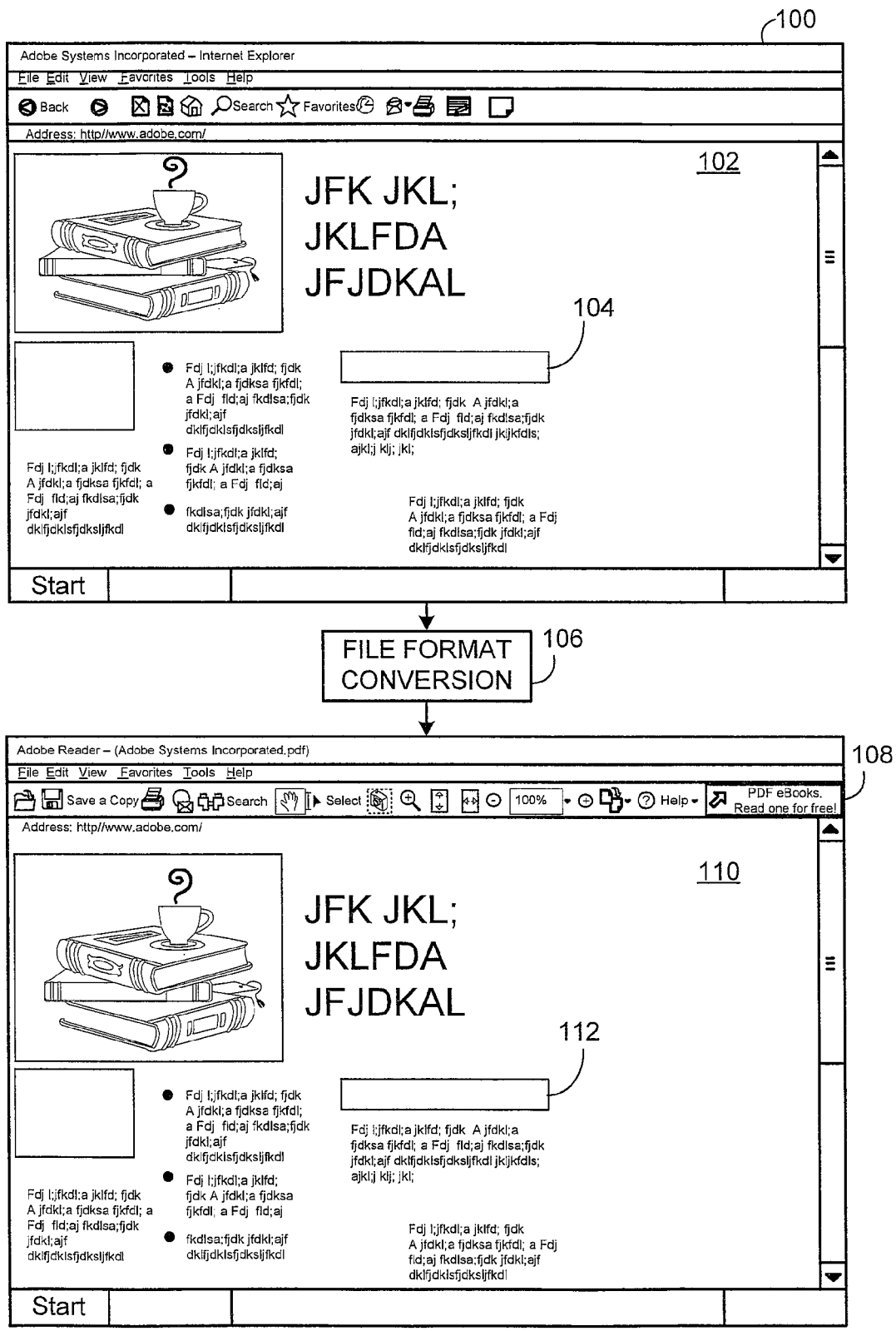
FIG. 1 is a diagram of a file format conversion process in which a file in a first format is converted to a file in a second format in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that the claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits and/or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term and/or may mean "and", it may mean "or", it may mean "exclusive-or", it may mean "one", it may mean "some, but not all", it may mean "neither", and/or it may mean "both", although the scope of the claimed subject matter is not limited in this respect.

In one or more embodiments, an object may refer to an item that may be selected and/or manipulated, for example shapes, pictures, and/or images that may appear an a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of the claimed subject matter is not limited in this respect. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. However, these are merely example definitions of terms relating to graphical user interfaces and/or computing platforms and/or the like, and the scope of the claimed subject matter is not limited in this respect.

Referring now to FIG. 1, a diagram of a file format conversion process in which a file in a first format is converted to a file in a second format in accordance with one or more embodiments will be discussed. As illustrated in FIG. 1, a first program, program 100, that is capable of interpreting, displaying, rendering, manipulating, and/or operating on information stored in a first file, file 102, in a first format. At least part of the information stored in file 102 may include one or more interactive elements 104 wherein a pointing device (not shown) of a graphical user interface of a computing platform in which program is executed may associate one or more units of information with interactive element 104, along with code that may be execute by program 100 in response to one or more pointing device events. For example, a pointing device may include a mouse, a trackball, a stylus, or the like type of input device for interaction with and/or control of the graphical user interface. In one embodiment, the pointing device may be a mouse type input device that controls the movement of a cursor or pointer on a display of the computing platform in conjunction with the graphical user interface of the computing platform. The mouse may be used to move the cursor to various locations on the display, for example on regions in which program 100 is displayed. When a user moves the cursor over and/or coincident with a region corresponding to interactive element 104, a over event may be detected by the graphical user interface, which then may communicate such an over event to program 100. In response to the over event, program 100 may execute code to cause a programmed response to an over event to occur. In one embodiment, for example, program 100 may he a web browser such as Internet Explorer available from Microsoft® Corporation of Redmond, Wash., USA, however this is merely one example of a web browser, and the scope of the claimed subject matter is not limited in this respect. In another embodiment, for example, program 100 may be a web browser such as the Firefox web browser available from the Mozilla Foundation of Mountain View, Calif., USA, although the scope of the claimed subject matter is not limited in this respect.

In one or more embodiments, file 102 may be in a Hypertext Markup Language (HTML) type format that is able to be processed by program 100. In such an embodiment, interactive element 104 may be defined by HTML code within file 100 in which one or more attributes and/or dynamic functions maybe associated with interactive element 104. In one particular embodiment, the pointing device may be a mouse. A over event, also referred to as a rollover event, may be defined at least in part by the placement of the mouse pointer and/or cursor over a region corresponding to interactive element 104 by a user using the graphical user interface. The user may cause such a placement, for example, by manually moving the mouse wherein the graphical user interface translates movements of the mouse into movements of the mouse pointerland or cursor on the display. A mouse click and/or similar actuation event may be defined as an event initiated when the mouse pointer and/or cursor is coincident with at least a portion of interactive element 104 and/or a pointing device input is made. For example, to cause a mouse click actuation event, the user may actuate one or more buttons disposed on the mouse. The graphical user interface may receive such an actuation as an input, and communicate the actuation event to program 100 which may then cause program to execute code in response to the actuation event, although the scope of the claimed subject matter is not limited in this respect.

In one or more embodiments, a user may desire to convert information stored in file 102 from a first file format into a second file format wherein the information may be stored in file 110. File 110 may be a format compatible with and/or readable by program 108 which may be a different program than program 100. For example, program 100 may be a web browser type program and file 102 may be an HTML type file. Where file 102 is an HTML type file that responds to an over event and/or to a mouse click actuation event, such file 102 may be considered to contain dynamic HTML content that provides dynamic functions, although the scope of the claimed subject matter is not limited in this respect. Program 108 may be, for example, Adobe® Acrobat® program available from Adobe Systems, Inc. of San Jose, Calif., USA, and file 110 may be an Adobe® Portable Document Format (PDF) type file, although the scope of the claimed subject matter is not limited in this respect. In an alternative embodiment, file 110 may be in any document descriptor format similar to that of a PDF type format, although the scope of the claimed subject matter is not limited in this respect. In one embodiment, a user may convert file 102 into file 110 using a file format conversion process 106, for example by using program 100 to print file 102 into file 110 using a printer driver that performs such a conversion. In another embodiment, a third program (not shown) may be utilized to read file 102 and convert file 102 into file 110. In yet another embodiment, program 108 may open and/or read file 102 and convert file 102 into file 110. However, these are merely examples of file format conversion process 106, and tie scope of the claimed subject matter is not limited in this respect. In accordance with one or more embodiments, as a result of file conversion process 106, file 110 may include interactive element 112 that may include one or more interactive features and/or dynamic functions as included with interactive element 104 of file 102, although the scope of the claimed subject matter is not limited in this respect.

Figure 2:
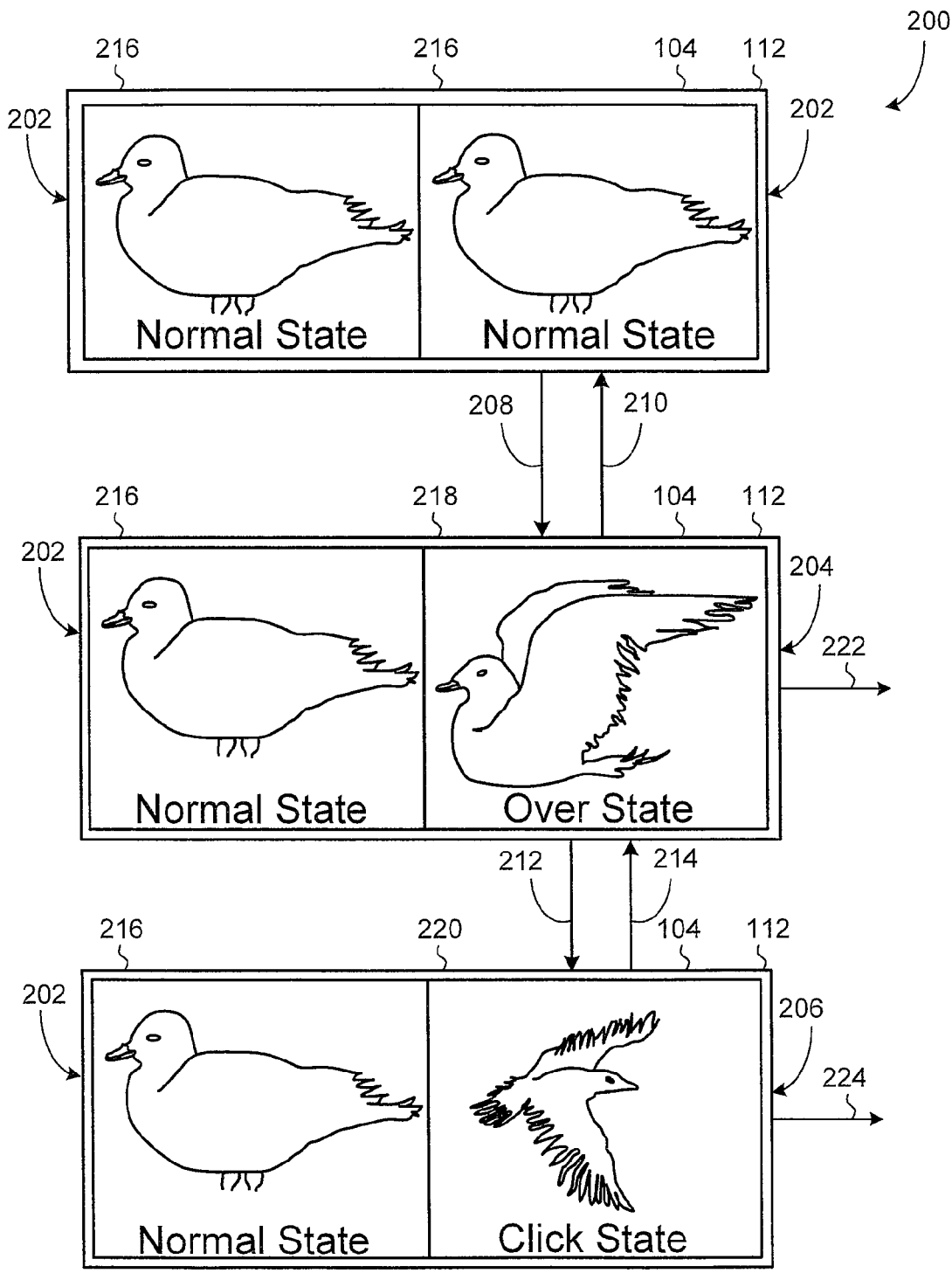
FIG. 2 is a diagram of an interactive element in accordance with one or more embodiments.

Referring now to FIG. 2, a diagram of an interactive element in accordance with one or more embodiments will be discussed. Interactive element 200 of FIG. 2 may correspond to interactive element 104 and/or interactive element 112 of FIG. 1. In one or more embodiments, file format conversion process 106 may capture the dynamic HTML content of interactive element 104 of file 102 which may then be converted into similar dynamic PDF content of interactive element 112 of file 110. For example, an HTML mouse over event of interactive element 104 of file 102 may be converted to the same and/or a similar dynamic function of interactive element 112 of file 110 in. PDF. The converted dynamic function in file 110 may exhibit one or more states for mouse handling events. In one or more embodiments, an over event 208 may be defined with respect to an active user interactive element, such as interactive element 104, on an HTML page, for example of file 102. If the user moves the mouse cursor over such an interactive element, which in a normal state may show a first visible content, the interactive element may change state, and for example a second visible content may appear. For example, such a change of state may occur when a user positions a mouse cursor over a region corresponding to interactive element 104. Likewise, if the user further actuates a mouse click during such an alternative state, the interactive element may again change state, and for example a third visible content may appear. For example, FIG. 2 shows a comparison of a normal state 202 with other mouse handling states for interactive element 104 and/or interactive element 104. In a normal state 202, first image may 216 be displayed for interactive element. 104. When a user places a mouse cursor over a region corresponding to interactive element 104, an over event may be detected at 208, and interactive element may transition from normal state 202 to over event state 204. Second image 218 may be displayed with respect to interactive element 104 and/or interactive element 112. In some embodiments, over event state 204 may optionally activate a link 222 such as a hyperlink to another file, to another portion of the present file, and/or to access another filed and/or machine at predetermined internet protocol (IP) address, Uniform Resource Locator (URL), and/or domain name, and/or in general to a Uniform Resource Identifier (URI), although the scope of the claimed subject matter is not limited in this respect. When a user moves the mouse cursor to another location away from a region associated with interactive element 104, an over event is no longer detected at 210, and interactive element 104 may transition from over event state 204 to normal state 202.

In one or more embodiments, when interactive element 104 is in over event state 204 and the user causes an actuation event 212, for example by clicking on a button on a mouse, or in another example by maintaining the mouse cursor over the region corresponding to interactive element 104 for a predetermined period of time, interactive element 104 may transition from over event state 204 to actuation event state 206, which may also referred as a click state. While in over event state 206, for example when the user is holding down the button on the mouse and maintaining the actuation, a third image 220 may be displayed with respect to interactive element 104. In one embodiment, upon the user causing actuation event 212 to occur, interactive element 104 optionally may activate link 224 in a manner similar to activation of link 222. In another embodiment, third image 220 may be displayed so long as the user is actuating an actuator such as a button on a mouse. When the user ceases the actuation, for example by releasing the button on the mouse, an actuation event is no longer detected at 214, and interactive element 104 may transition from actuation event state 206 to over event state 204, upon which time link 224 may be activated, although the scope of the claimed subject matter is not limited in this respect.

Figure 3:
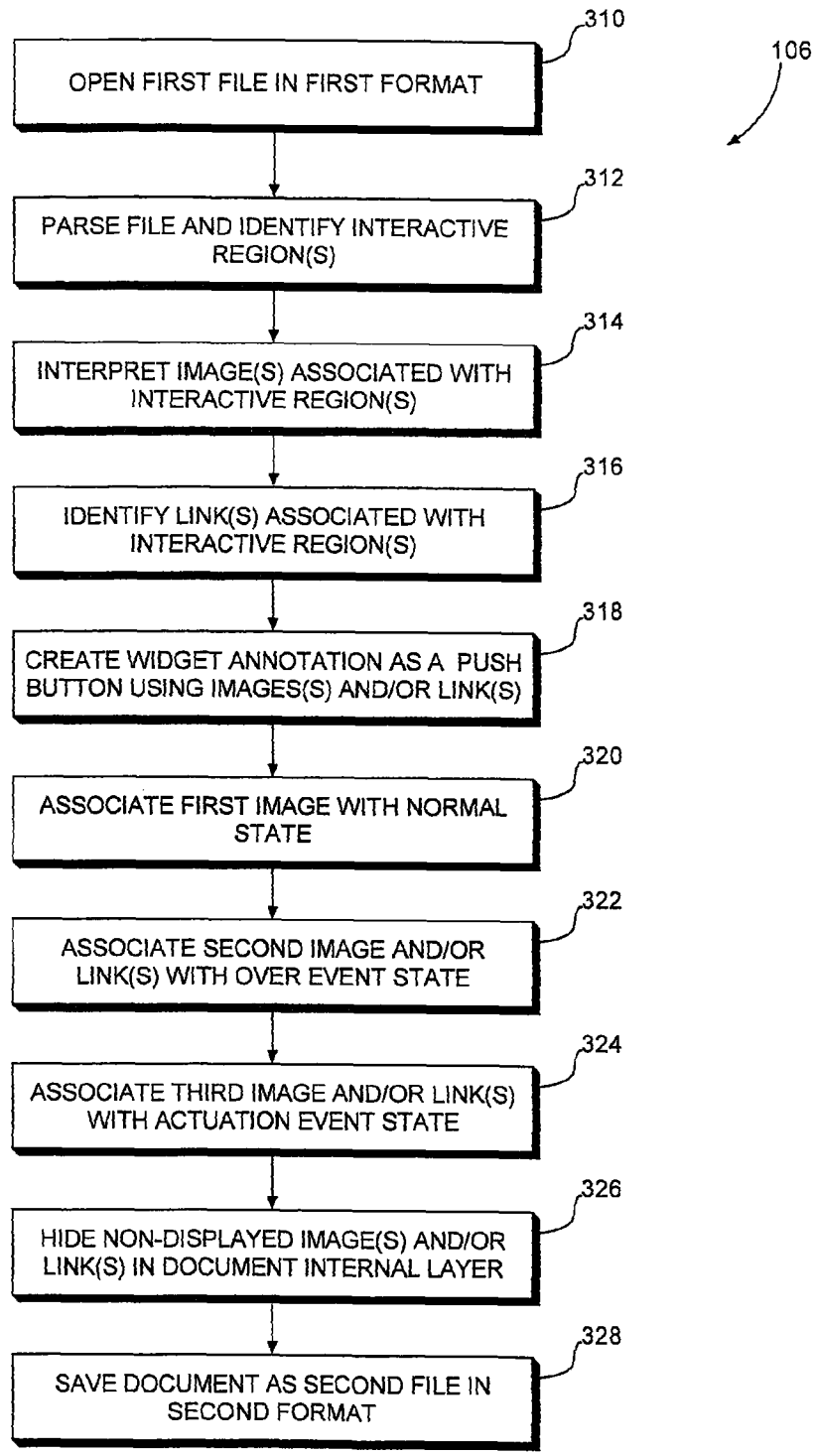
FIG. 3 is a flow diagram of a method in which an interactive element in a first file format may be converted to an interactive element in a second file format accordance with one or more embodiments.

Referring now to FIG. 3, a low diagram of a method in which an interactive element in a first file format may be converted to an interactive element in a second file format accordance with one or more embodiments will be discussed. In one or more embodiments, method 106 of FIG. 3 may include blocks 310 through 328, may contain fewer and/or more blocks shown in FIG. 3, and/or is not necessarily limited to the order of blocks shown in FIG. 3, and the scope of the claimed subject matter is not limited in this respect. In one or more embodiments, method 106 may be implemented using Adobe® GoLive® CS2 software or the like available from Adobe Systems, Incorporated, of San Jose, Calif., USA, although the scope of the claimed subject matter is not limited in this respect. In one embodiment, a user may print and/or export file 102 using program 100 such as a web browser, for example using a plug-in hardware and/or software module, and/or a printer driver, to implement file format conversion process 106. In another embodiment, a user may import and/or read file 102 into program 108 and convert file 102 into file 110, for example using Adobe® GoLive® CS2 software, although the scope of the claimed subject matter is not limited in this respect.

In one embodiment, file 102 in a first format may be opened at block 310. File 102 may be parsed at block 312 to identify one or more interactive elements 104. One or more images associated with interactive element 104, such as image 216, image 218, and/or image 220, may be interpreted at block 314. An example of such interpreted images may include images defined in file 102 using the format of program 100 to indicate one or more dynamic functions associated with interactive element 104, for example in HTML, images declared in file 102 as "Form-Image", images with "onmouseXXX"

values, and/or having the (script)action:changeImages. In an alternative embodiment, interpreted images may be defined as indicating one more dynamic functions associated with interactive element 104 using various other programs, for example as defined by Adobe® ImageReady® and/or Adobe® Photoshop® CS2, although the scope of the claimed subject matter is not limited in this respect. In an alternative embodiment, images may be interpreted at block 314 based on, for example, dynamic functions of interactive element 104 as defined by a scripting language such as JavaScript, a dynamic scripting language supporting prototype based object construction developed by Netscape Communications of Mountain View, Calif., USA, although the scope of the claimed subject matter is not limited in this respect.

At block 316, one or more links, such as link 222 and/or link 224, and the destination and/or destinations thereof, may be identified as dynamic functions associated with the states of interactive element 104, for example normal state 202, over event state 204, and/or actuation event state 206. A widget annotation such as a push button may be created at block 318 to be associated with the one or more links and/or one or more images. The widget annotation may correspond to interactive element 112 of file 110, for example. The widget annotation may be created as interactive element 112 having one or more dynamic functions, for example, a first image may be associated with a normal state of the widget annotation at block 320, a second image and/or a link may be associated with an over event state of the widget annotation at block 322, and a third image and/or a link may be associated with an actuation event state at block 324. Non-displayed images and/or links for a given state may be hidden at block 326 in an internal layer of the document corresponding to file 108. For example, the first, second, and/or third images may reside in the same location within the file, and based on a condition, the first image may be replaced with the second image in approximately the same region that the first image was previously displayed. Likewise, the second image may be replaced with the third image based on another condition. The document may then be saved as file 108 in a format of program 108, for example as a PDF type file, although the scope of the claimed subject matter is not limited in this respect. Thus, in one embodiment, the widget annotation such as a push button may provide at least part and/or all of tie dynamic functions of interactive element 104 of file 102 with interactive element 112 of file 110, for example, where the dynamic functions of the push button in PDF format file may reflect the dynamic functions of an HTML mouse rollover interactive element, although the scope of the claimed subject matter is not limited in His respect. For example, a URI, a GoTo action, and/or a GoToR action of Adobe® GoLive® CS2 software may be associated with such a push button, and link updating and/or automation may be provided using a Link Annot function of Adobe® GoLive® CS2, although the scope of the claimed subject matter is not limited in this respect. Thus, a push button in a PDF formatted file or the like such as file 110 may implement interactive element 112 in file 110 to provide the dynamic functions of mouse rollover and/or mouse button click down events as provided by interactive element 104 of an HTML type file such as file 102, although the scope of the claimed subject matter is not limited in this respect. In one or more embodiments, file format conversion process 106 may be implemented automatically when saving and/or converting an HTML type file into a PDF type file. Since at least some of the links and/or images of the internal PDF structure may be hidden at block 328, the structure of the push button may not be displayed and/or otherwise apparent to the user, and for the user interactive element 112 in the PDF type file may appear to function as interactive element 104 of an HTML type file, although the scope of the claimed subject matter is not limited in this respect. In one embodiment, if there is a Fast Web View link associated with interactive element 104 on a HTML type page, for example pdf#page=20, desk, such a Fast Web View link may be identified at block 316 and/or implemented using block 322 and/or block 324 using a GoToR Action in Adobe® GoLive® CS2 wherein a D (Destination) entry provided by interactive element 104 may be incorporated by interactive element 112, although the scope of the claimed subject matter is not limited in this respect.

Figure 4:
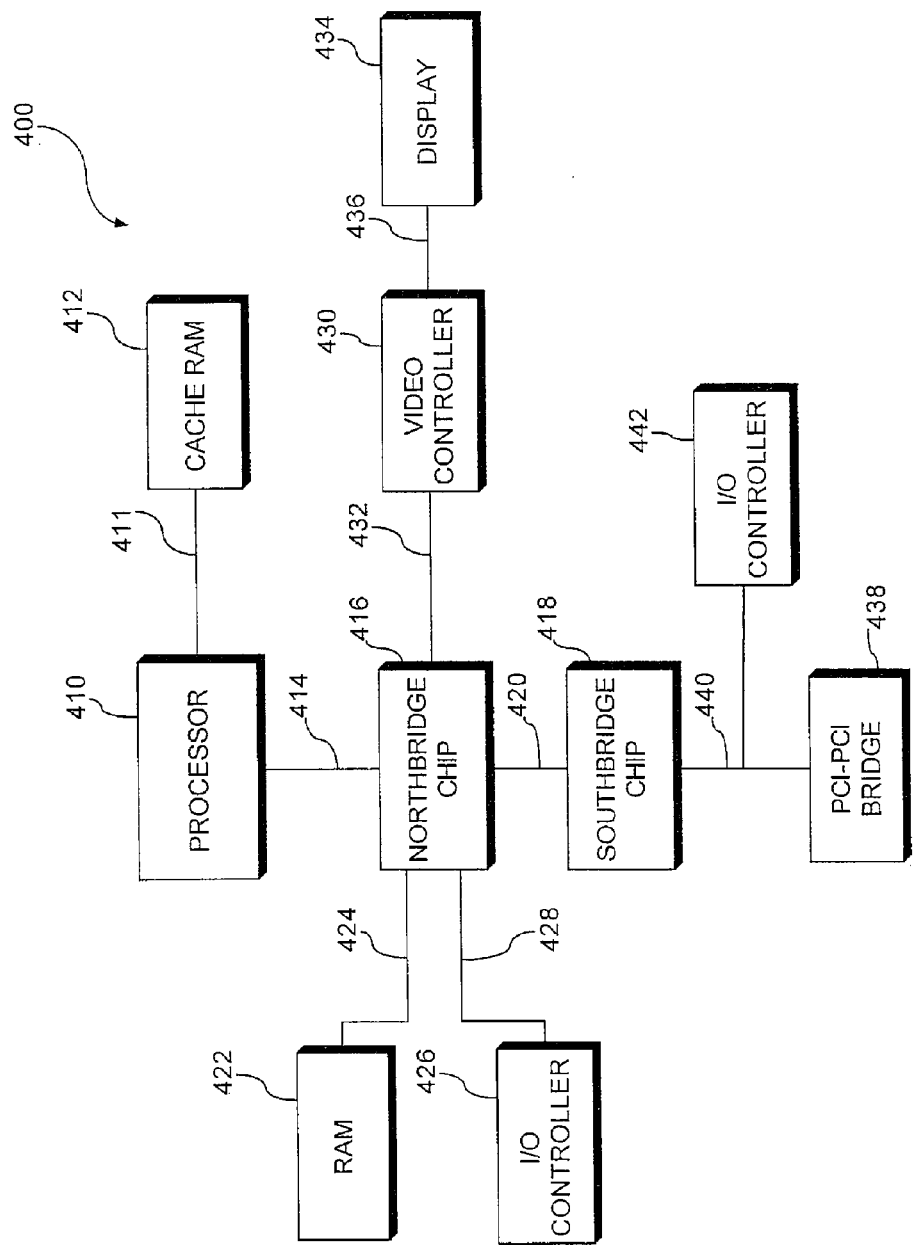
FIG. 4 is a block diagram of a computing platform in accordance with one or more embodiments.

Referring now to FIG. 4, a block diagram of a computing platform in accordance with one or more embodiments will be discussed. Computing platform 400 may include processor 410 coupled to cache random access memory (RAM) 412 via back side bus 411. Processor 410 may also couple to a chipset that includes Northbridge chip 416 via front side bus 414, and also to Southbridge chip 418 via bus 420. In one embodiment, Northbridge chip 416 in general may be utilized to connect a processor to memory, to an input/output bus, to a video bus, and to Level 2 cache, although the scope of the claimed subject matter is not limited in this respect. In one embodiment, Southbridge chip 418 may be utilized to control input/output functions, the basic input/out system (BIOS), an interrupt control functions of Integrated Drive Electronics (IDE) devices such as hard disks or compact disk-read only memory (CD-ROM) devices or the like, although the scope of the claimed subject matter is not limited in this respect. Random access memory (RAM) 422 may couple to Northbridge chip 416 via main memory bus 424, and input/output (I/O) controller 426 may also couple to Northbridge chip 416 via I/O bus 428. In one embodiment, I/O controller 426 and I/O bus 428 may be in compliance with a Small Computer Systems Interface (SCSI) specification such as the American National Standards Institute (ANSI) X3.131-1994 SCSI-2 specification, although the scope of the claimed subject matter is not limited in this respect. In an alternative embodiment, I/O controller 426 and I/O bus 428 may be in compliance with a Peripheral Component Interconnect (PCI) bus, although the scope of the claimed subject matter is not limited in this respect.

Video controller 430 may couple to Northbridge chip 416 via video bus 432 which in one embodiment may comprise an Accelerated Graphics Port (AGP) bus, although the scope of the claimed subject matter is not limited in this respect. Video controller 430 may provide video signals to an optionally coupled display 434 via display interface 436 which in one embodiment may comprise a Digital Visual Interface (DVI) in compliance with a standard promulgated by the Digital Display Working Group, although the scope of the claimed subject matter is not limited in His respect. Southbridge chip 418 may couple to a peripheral component interconnect to peripheral component interconnect (PCI-PCI) bridge 438 via input/output bus 440, which may in turn couple to I/O controller 442 to control various peripheral devices such as Universal Serial Bus (USB) devices, or devices compatible with an Institute of Electrical and Electronics Engineers (IEEE) 1394 specification, although the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that the subject matter pertaining to interactive element file format conversion in a graphical user interface and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is

1. A method, comprising:
executing instructions by a computing device to:
electronically parse electronic digital signals representative of a first file having a first format to identify one or more interactive elements defined in said first format, the one or more interactive elements configured to provide one or more dynamic functions, at least one of said dynamic functions comprising cursor control interactivity;
electronically create electronic digital signals representative of a second file in a second format based at least in part on said first file, said second file includes one or more interactive elements defined in said second format that provide one or more dynamic functions associated with states of said interactive elements defined in said first format in said second file, at least one of said dynamic functions comprising cursor control interactivity; and
electronically apply an actuation event to at least one of said interactive elements of said second file to change a state of said at least one of said interactive elements, the changing said state is associated with a change in displayed information from a first image to a second image and that reverts back to the first image when the actuation event is no longer detected.

2. The method of claim 1, wherein said actuation event comprises a rollover event.

3. The method of claim 1, wherein said first format comprises a hypertext markup language type format and said second format comprises a non-hypertext markup language type format.

4. The method of claim 1, and further comprising executing said instructions by said computing device to parse said electronic digital signals representative of said first file by electronically interpreting one or more images and/or one or more links associated with said interactive elements.

5. The method of claim 1, and further comprising further executing instructions by said computing device to:
electronically associate a first image with a normal state in said one or more interactive elements of said second file; and
electronically associate a second image with an event state in said one or more interactive elements of said second file, wherein said first image is based at least in part on an image associated with a normal state in said one or more interactive elements of said first file, and said second image is based at least in part on an image associated with an event state in said one or more interactive elements of said second file.

6. The method of claim 1, and further comprising further executing instructions by said computing device to:
electronically associate a first image with a normal state in said one or more interactive elements of said second file;
electronically associate a second image with a first event state in said one or more interactive elements of said second file; and
electronically associate a third image and/or a link with a second event state in said one or more interactive elements of said second file,
wherein said first image is based at least in part on an image associated with a normal state in said one or more interactive elements of said first file, said second image is based at least in part on an image associated with a first event state in said one or more interactive elements of said first file, and said third image and/or link is based at least in part on an image and/or a link associated with a second event state in said one or more interactive elements of said first file.

7. The method of claim 1, and further comprising further executing instructions by said computing device to:
electronically associate a first image with a first state in said one or more interactive elements of said second file; and
electronically associate a second image with a cursor rollover event state in said one or more interactive elements of said second file,
wherein said first image is based at least in part on an image associated with a normal state in said one or more interactive elements of said first file, and said second image is based at least in part on an image associated with a cursor rollover event state in said one or more interactive elements of said second file.

8. The method of claim 1, and further comprising further executing instructions by said computing device to create said electronic digital signals representative of said second file by electronically associating a first image with a first state in said one or more interactive elements of said second file;
electronically associate a second image with a cursor rollover event state in said one or more interactive elements of said second file; and
electronically associate a third image and/or a link with an actuation event state in said one or more interactive elements of said second file,
wherein said first image is based at least in part on an image associated with a normal state in said one or more interactive elements of said first file, said second image is based at least in part on an image associated with a cursor rollover event state in said one or more interactive elements of said first file, and said third image and/or link is based at least in part on an image and/or a link associated with an actuation event state in said one or more interactive elements of said first file.

9. The method of claim 1, and further comprising further executing instructions by said computing device to electronically hide a non-displayed dynamic function of said one or more interactive elements of said second file in an internal layer of said second file while displaying another dynamic function of said one or more interactive elements of said second file.

10. The method of claim 1, wherein said displayed information includes one or more graphic elements.

11. The method of claim 1, further comprising creating a push button associated with at least one of said interactive elements.

12. An apparatus comprising:
a display; and
a processor coupled to said display and programmed with instructions to:
parse a first electronic file having a first electronic file format to identify one or more interactive elements defined in said first electronic file format, the one or more interactive elements configured to provide one or more dynamic functions, at least one of said dynamic functions comprising cursor control interactivity;

create a second electronic file in a second electronic file format based at least in part on said first electronic file, said second electronic file includes one or more interactive elements defined in said second electronic file format that provide one or more dynamic functions associated with states of said interactive elements defined in said first electronic file format in said second electronic file, at least one of said dynamic functions being cursor control interactivity; and apply an actuation event to at least one of said interactive elements of said second electronic file to change a state of said at least one of said interactive elements, the changing said state is associated with a change in displayed information from a first image to a second image and that reverts back to the first image when the actuation event is no longer detected.

13. The apparatus of claim 12, wherein said first electronic file format comprises a hypertext markup language type format and said second electronic tile format comprises a non-hypertext markup language type format.

14. The apparatus of claim 12, wherein said processor is further programmed with instructions to interpret one or more images and/or one or more links associated with said interactive elements.

15. The apparatus of claim 12 wherein said processor is further programmed with instructions to hide a non-displayed dynamic function of said one or more interactive elements of said second electronic file in an internal layer of said second electronic file while displaying another dynamic function of said one or more interactive elements of said second electronic file.

16. An apparatus comprising:
a computer platform comprising one or more processors programmed with instructions to:
parse a first file having a first format to identify one or more interactive elements defined in said first format, the one or more interactive elements configured to provide one or more dynamic functions, at least one of said dynamic functions comprising cursor control interactivity;

create a second file in a second format based at least in part on said first file, said second file includes one or more interactive elements defined in said second format that provide one or more dynamic functions associated with states of said interactive elements defined in said first format in said second file, at least one of said dynamic functions being cursor control interactivity; and apply an actuation event to at least one of said interactive elements of said second file to change a state of said at least one of said interactive elements, the changing said state of said at least one of said interactive elements of said second file is associated with a change in information displayed according to said second file from a first image to a second image and that reverts back to the first image when the actuation event is no longer detected.

17. The apparatus of claim 16, wherein said first format is a hypertext markup language type format and said second format is a non-hypertext markup language type format.

18. The apparatus of claim 16, wherein said one or more processors is further programmed with instructions to interpret one or more images and/or one or more links associated with said interactive elements.

19. The apparatus of claim 16, wherein said one or more processors is further programmed with instructions to:
associate a first image with a normal state in said one or more interactive elements of said second file; and
associate a second image with an event state in said one or more interactive elements of said second file,
wherein said first image is based at least in part on an image associated with a normal state in said one or more interactive elements of said first file, and said second image is based at least in part on an image associated with an event state in said one or more interactive elements of said second file.

20. The apparatus of claim 16, wherein said displayed information includes one or more graphic elements.

* * * * *